(12) United States Patent
Dyck et al.

(10) Patent No.: US 7,710,905 B2
(45) Date of Patent: May 4, 2010

(54) LINK LATENCY DETERMINATION FOR OPTIMAL MOBILE IP RE-REGISTRATION

(75) Inventors: Jeffrey Dyck, San Diego, CA (US); Jayanth Mandayam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1973 days.

(21) Appl. No.: 10/681,883

(22) Filed: Oct. 8, 2003

(65) Prior Publication Data

US 2004/0260831 A1 Dec. 23, 2004

Related U.S. Application Data

(60) Provisional application No. 60/471,144, filed on May 16, 2003.

(51) Int. Cl.
*H04B 7/00* (2006.01)
(52) U.S. Cl. ...................... 370/310; 709/224
(58) Field of Classification Search ......... 370/310–350; 455/433–435
See application file for complete search history.

(56) References Cited

U.S. PATENT DOCUMENTS 5,943,480 A * 8/1999 Neidhardt ................ 709/226
6,757,255 B1 * 6/2004 Aoki et al. ............... 370/252

OTHER PUBLICATIONS

P. Karn, C. Partridge: "Improving Round-Trip Time Estimates in Reliable Transport Protocols"; Proceeding of Signcomm '87, vol. 17, No. 5, Oct. 1987, pp. 1-9.*

Perkins, C. "IP Mobility Support" ; Network Working Group, Request for Comments: 2002, Oct. 1996.*

V. Paxson, M. Allman; "Computing TCP's Retransmission Timer"; RFC 2988, 'Online! Nov. 2000; pp. 1-6; Internet RFC Archives; Retrieved from the Internet: URL: http://www.faqs.org/frcs/rfc2988.html>'retrieved on Nov. 4, 2004.

P. Karn, C. Partridge: "Improving Round-Trip Time Estimates in Reliable Transport Protocols"; Proceeding of Sigcomm '87, vol. 17, No. 5, Oct. 1987, pp. 1-9.

Helen Chen, Jim Hutchins, Jim Brandt: "Evaluation of DEC's Gigaswitch for distributed parallel computing"; SAND93-8013B; Dec. 1993; pp. 1-29, p. 10, paragraph III.

Mark Allman, Jim Griner, Alan Richard; "TCP Behavior in Networks with Dynamic propagation Delay"; Proceedings of IEEE Globecom 2000, 2000, pp. 1-6.

(Continued)

*Primary Examiner*—Derrick W Ferris
*Assistant Examiner*—Mohammad Anwar
(74) *Attorney, Agent, or Firm*—Howard H. Seo; Darren M. Simon (57) ABSTRACT

A method and system for link latency determination in a Mobile IP network determine an unloaded network delay; set a current estimated delay; initiate a current round trip estimation process; and set a retry timer. If the retry timer expires before the process completes, the method and system update the predetermined backoff period and repeat the preceding two steps. After re-registration, the method and system reset the current estimated delay time. The link latency determination optimizes the re-registration process between a mobile device and an agent device, thereby enhancing mobile device communications, minimizing network loading, and optimizing network traffic levels.

15 Claims, 7 Drawing Sheets

OTHER PUBLICATIONS

Steven Bakker, Michael H. Behringer; "A Guide to Acceptance Testing"; DIP-No. 24, 'Online! May 13, 1996, pp. 1-8.

Anon: "End-to-end performance", Research Report 2003; pp. 1-12, Retrieved from the Internet: URL: http://www.ces.net.doc/2003/research/qos.html>'retrieved on Nov. 11, 2004.

International Search Report, PCT/US2004/015206, International Searching Authority, European Patent Office, Nov. 16, 2004.

Written Opinion, PCT/US2004/015206, International Searching Authority, European Patent Office, Nov. 16, 2004.

International Preliminary Report on Patentability, PCT/US2004/015206, International Preliminary Examining Authority, United States, Mar. 29, 2007.

* cited by examiner

LINK LATENCY DETERMINATION FOR OPTIMAL MOBILE IP RE-REGISTRATION

RELATED APPLICATIONS

This application claims priority to U.S. Provisional Application Ser. No. 60/471,144 filed May 16, 2003.

BACKGROUND

The present invention generally relates to mobile networks and, more particularly, to a system and method to determine link latency during the re-registration process of mobile IP enabled devices.

In traditional Internet Protocol (IP) routing, IP addresses represent the location of specific network nodes within a network topology, allowing packet delivery. To receive packets under this scheme, routing mechanisms assume that each network node maintains the same point of attachment to the network topology of the Internet. Furthermore, routing mechanisms assume that each network node has one associated IP address that uniquely identifies the network node's point of attachment. When a network node dispatches a packet intended for a recipient device, intermediate Internet routers receive the packet and analyze the subnet prefix of its IP address to determine the network of the recipient device. Each intermediate router forwards the packet to the ascertained next closest router. Finally, when the packet arrives at the route on the device's subnet, the router analyzes the remaining bits in the IP address to identify the specific recipient device and completes delivery.

If, however, a device connects to the Internet via a subnet other than the subnet associated with the IP address of the device, traditional Internet routing will not deliver data destined for the device to the subnet on which it is attached. Therefore, traditional IP routing does not provide sufficient means for communication to mobile device users traveling between subnets.

Mobile IP enhances traditional IP by adding mechanisms for forwarding Internet traffic to mobile nodes or mobile stations; i.e., mobile devices or wireless communication devices having, for example, a transmitter and a receiver. Typically, mobile devices include, but are not limited to, cellular telephones, handheld devices, laptop computers and routers. Mobile IP assigns each mobile device a traditional home IP address, which dictates its topologically correct "home" network. Such mobile devices also maintain an associated care-of address (COA) that identifies the location of the mobile device as it changes its point of attachment. Each time a user moves the mobile device to a different network, the mobile device acquires a new COA. A home agent (HA) on the home network associates each mobile's permanent address with its current COA.

Versions of Mobile IP include Mobile IPv4, Mobile IPv6, and HMIPv6. In Mobile IPv4, traffic for the mobile device is sent to the home network but is intercepted by the HA and forwarded via tunneling to the appropriate COA. Foreign agents (FA) may act as intermediary forwarding devices between the mobile device and the HA. In certain embodiments, packet data serving nodes (PDSNs) provide the primary wireless mobile data access to, for example, the Internet or intranets. Mobile IPv6 minimizes tunneling and includes mechanisms that make FAs unnecessary. HMIPv6 reduces the amount of signaling required to improve handoff speed for mobile connections by replacing FAs with Mobility Anchor Points (MAPs), which can be located anywhere in a hierarchy of routers.

Registration is a critical function in Mobile IP. Each time the mobile device changes its COA, it registers with the HA by forwarding a binding update to the HA via Internet Control Message Protocol (ICMP) in IPv6 networks, or by sending a Registration Request via the FA in IPv4 networks. Mobile IP registration provides a means for the mobile device to communicate its current location to the HA. Each registration has an associated lifetime for which the HA and FA (if applicable) will provide forwarding services.

In versions of Mobile IP using FAs, PDSNs, or MAPs (collectively, intermediary devices), the mobile device sends a registration request (RRQ) to the intermediary device to begin registration. The intermediary device processes the RRQ and relays it to the HA. Upon receipt of the RRQ, the HA processes the request and sends a registration reply (RRP) granting or denying the request to the intermediary device. In turn, the respective intermediary device processes the RRP and relays the reply to the mobile device, thus notifying it of the disposition of its request. In instances where the mobile device registers a co-located COA, the mobile device forwards the RRQ directly to the HA. The HA responds with a corresponding RRP directly to the mobile device.

Networks typically implement relatively short registration lifetimes to minimize the impact of zombie Mobile IP registrations on HA and FA/MAP resources. Therefore, to maintain connectivity, as well as accurate COA and reachability information, a mobile device requests re-registration to the HA via RRQs, sent in-band with data, often during data transfer. The mobile device then awaits receipt of an RRP from the HA corresponding to the RRQ. To address the possibility of loss of the RRQ or RRP messages, the mobile device typically sets a retry timer upon dispatch of an RRQ. If the mobile device receives a valid RRP prior to expiration of the time on the retry timer (RRQ timeout), re-registration is completed. If, however, the retry time expires prior to receipt of the corresponding RRP, the mobile device dispatches a subsequent RRQ. Unnecessary re-registration requests (RRQ retransmissions) may be sent when re-registration occurs during a data transfer since buffering and other factors may increase the latency of the re-registration reply beyond the RRQ timeout.

The Internet Official Protocol Standards (STD 1), Request For Comments (RFC) 2002, Section 3.6.3, *IBM* (1996) suggests a simple geometric backoff algorithm comprising the steps of sending a new RRQ after a specified retransmission timeout (minimum one second), and increasing the retransmission timeout (the backoff period), at a minimum, by a multiplier of two. Under this formula, the timeout eventually increases to a value greater than the time required for the RRP to arrive after the RRQ has been sent; i.e., the round trip time (RTT).

Despite the backoff algorithm's attempt to regulate retransmission of re-registration requests, if the mobile device receives a valid RRP to a predecessor request after dispatch of a successor request, then the mobile device is obligated to discard the reply, delaying completion of mobile node re-registration, increasing traffic on the network, and adversely loading the network infrastructure.

It is apparent that a need exists for an improved system and method for timing request retransmissions that effect re-registration while minimizing unnecessary transmissions. There is also a need for a system and method to enhance mobile device communications, minimize network loads, and optimize network traffic levels by means of optimized Mobile IP re-registration.

SUMMARY

In one aspect of the present invention, a method for link latency determination in a communication network includes the steps of determining an unloaded network delay for round trip traversal of the link according to an initial registration process; setting a current estimated delay equal to the unloaded network delay; upon commencement of a subsequent registration attempt, initiating a current round trip estimation process which has a start time and an end time; setting a retry timer equal to the sum of a predetermined backoff period and the current estimated network delay; and if the retry timer expires before the end time of the potentially concurrent current round trip estimation process, updating the predetermined backoff period and repeating the two preceding steps; and at the end of the subsequent registration, resetting the current estimated delay equal to the difference between the end time of the current round trip estimation process and the start time of the current round trip estimation process.

Although the current round trip estimation process generally refers to a re-registration attempt on the part of the mobile device with the home agent, a skilled artisan will recognize that other applications and examples exist as well. The start time of the current round trip estimation process may be associated with, for example, the send time of an RRQ during a re-registration attempt; and the end time of the current round trip estimation process may be associated with, for example, the receipt time of the RRP corresponding thereto.

The predetermined backoff period may be updated according to a predetermined algorithm, including the aforementioned backoff registration retry algorithm.

In another aspect of the present invention, a method for determination of link latency in a Mobile IP network includes the steps of determining an unloaded network delay according to an initial registration process; setting a current estimated delay equal to the unloaded network delay; upon commencement of a re-registration attempt, noting a send time of a current round trip estimation process; setting a retry timer equal to the sum of a predetermined backoff period and the current estimated network delay; and if the retry timer expires before receipt of a re-registration reply, updating the predetermined backoff period and repeating the two preceding steps; and if the retry timer does not expire before receipt of the re-registration reply, noting the receipt time of the current round trip estimation process and resetting the current estimated delay equal to the difference between the receipt time and the send time.

In a further aspect of the present invention, a method for determination of link latency in a Mobile IP network includes steps of noting a send time of an initial registration request from the mobile device to the home agent; noting a receipt time of a registration reply corresponding to the initial registration request from the home agent to the mobile device; determining an unloaded network delay according to the formula:

$$RTT(0)=(RRP(initial)-RRQ(initial)),$$

wherein RTT(0) represents the initial registration round trip delay, RRP(initial) represents the receipt time of the initial registration reply, and RRQ(initial) represents the send time of the initial registration request; setting a current estimated delay equal to the unloaded network delay; noting a send time of a request for re-registration; setting a retry timer equal to the sum of a predetermined backoff period and the current estimated network delay; and if the retry timer expires before receipt of a registration reply message, updating the predetermined backoff period and repeating the preceding three steps; and if the retry timer does not expire before receipt of the registration reply message, noting the receipt time of the re-registration reply message and setting the current estimated delay equal to the difference between the receipt time and the send time.

In a still further aspect of the present invention, a method for determination of link latency in a communication network includes steps for calculating an unloaded network delay for round trip traversal of the link according to an initial registration process; establishing a current estimated delay according to the unloaded network delay; adding a predetermined backoff period to the current estimated delay; setting a retry timer upon commencement of a Mobile IP registration attempt, with the retry timer set according to the sum derived in the preceding step; optionally, initiating the current round trip delay estimation process; if the preceding step was initiated, updating the current estimated round trip delay if the end event of the current round trip delay estimation process occurs; recalculating the backoff period and repeating the two preceding steps if the retry timer expires before the end time of the current round trip estimation process; and determining the current estimated delay according to the difference between the end time of the current round trip estimation process and the start time of the current round trip estimation process, if the retry timer does not expire before the end time of the current round trip estimation process.

In an additional aspect of the present invention, a system includes a first device; a second device; a communication path linking the first device and the second device; and at least one module that determines the link latency associated with traversal of the communication path between the first device and the second device.

In yet another aspect of the present invention, a Mobile IP network includes means for providing a first device; means for providing a second device; means for communication between the first device and the second device; means for determining an unloaded network delay for round trip traversal of the link during initial Mobile IP registration; means for setting a current estimated delay equal to the unloaded network delay; means for setting a retry timer equal to the sum of a predetermined backoff period and the current estimated network delay; means for updating the predetermined backoff period and resetting the retry timer equal to the sum of the predetermined backoff period and the current estimated network delay when the retry timer expires before an end time of a current round trip estimation process; and means for resetting the current estimated delay equal to the difference between the end time of the current round trip estimation process and a start time of the current round trip estimation process when the retry timer does not expire prior to the end time of a current round trip estimation process.

In a further aspect of the present invention, a communication network includes means for providing a first device; means for providing a second device; means for communication between the first device and the second device; means for determining an unloaded network delay for round trip traversal of the link according to an initial registration process; means for setting a current estimated delay equal to the unloaded network delay; means for setting a retry timer equal to the sum of a predetermined backoff period and the current estimated network delay; means for updating the predetermined backoff period when the retry timer expires before an end time of a current round trip estimation process; means for resetting the retry timer equal to the sum of the predetermined backoff period and the current estimated network delay; and means for resetting the current estimated delay equal to the difference between the end time of the current round trip estimation process and a start time of the current round trip estimation process when the retry timer does not expire prior to the end time of a current round trip estimation process.

In a still further aspect of the present invention, a wireless communication sub-network include a mobile device; a home agent; means for communication between the mobile device and the home agent; means for noting a send time of an initial registration request from the mobile device to the home agent via the means for communication; means for noting a receipt time of a registration reply corresponding to the initial registration request from the home agent to the mobile device via the means for communication; means for determining the unloaded network delay according to the formula:

RTT(0)=(RRP(initial)−RRQ(initial)), wherein RTT(0) represents the initial registration round trip delay, RRP(initial) represents the receipt time of the initial registration reply, and RRQ(initial) represents the send time of the initial registration request; means for setting a current estimated delay equal to the unloaded network delay; means for noting a send time of a request for re-registration from the mobile device to the home agent via the means for communication; means for setting a retry timer equal to the sum of a predetermined backoff period and the current estimated network delay; means for updating the predetermined backoff period and means for resetting the retry timer if the retry timer expires before receipt of a registration reply message; means for noting the receipt time of the registration reply message from the home agent to the mobile device via the communications path; and means for setting the current estimated delay equal to the difference between the receipt time (end event) and the send time (start event).

In yet a further aspect of the present invention, a Mobile IP communications network includes a mobile device; a home agent; a communication path linking the mobile device and the home agent; an unloaded network delay module for determining an unloaded network delay for traversal of the communication path between the mobile device and the home agent according to an initial registration process; a current estimated delay module for setting a current estimated delay equal to the unloaded or loaded network delay; a request send time module for noting a send time of a request for re-registration between the mobile device and the home agent via the communication path; a retry timer module for setting a retry timer equal to the sum of a predetermined backoff period and the current estimated network delay; a timer expiration module for updating the predetermined backoff period and notifying the retry timer module if the retry timer expires before receipt of a re-registration reply message from the home agent to the mobile device via the communication path; a registration reply receipt time module for noting the receipt time of the re-registration reply message by the mobile device; and a reset module for setting the current estimated delay equal to the difference between the receipt time and the send time.

Further advantages of the invention will be brought out in the following portions of the specification, wherein the detailed description is for the purpose of disclosing exemplary embodiments of the invention without placing limitations thereon.

DETAILED DESCRIPTION

The following detailed description is of the best currently contemplated method of carrying out the invention. The description is not intended in a limiting sense, but serves to illustrate the general principles of the invention, the scope of which is defined by the appended claims.

The present invention provides a system and method for accurate determination of variable latent delay between transmission and receipt of traffic transferred over a specific link in a communication network; for example, a Mobile IP network, and optimization of a process utilizing said link. The latency determination improves processes such as re-registration of a mobile device with an agent device. The latency determination optimizes the timing of re-registration request transmissions, thereby ensuring timely completion of the re-registration process; minimizes network traffic incurred eliminating redundant re-registration requests and minimizes discarded re-registration replies necessitated by delayed delivery; and increases mobile device performance.

Figure 1:
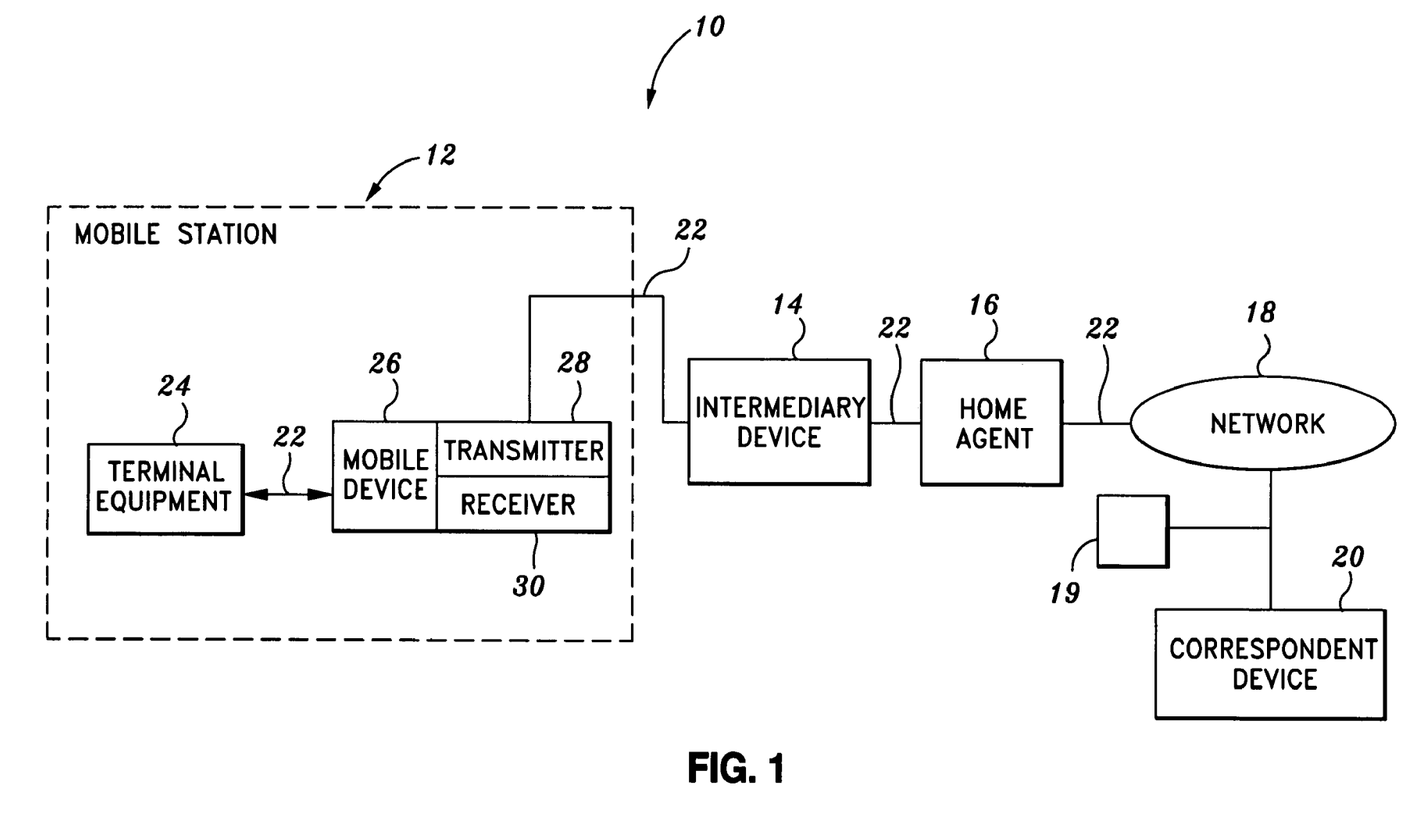
FIG. 1 is a diagram of a wireless communication sub-network according to an embodiment of the present invention.

Turning now to the drawings, wherein like items are referenced with the same numerals, FIG. 1 generally shows a wireless communication sub-network 10 according to an embodiment of the present invention. The wireless communication sub-network 10 may include a mobile station (MS) 12; an intermediary device 14; a home agent (HA) 16; a network 18, for example, the Internet; and a correspondent device 20, i.e., a device transmitting communications intended for the MS 12 or a device intended as the recipient of communications from the MS 12. Typically, messages and data may traverse one or more communication paths 22 via the aforementioned components to effect communications between the MS 12 and the correspondent device 20.

The MS 12 may further comprise terminal equipment (TE) 24 and a mobile device 26 that can have a transmitter 28 and a receiver 30 for transmitting and receiving communications, respectively. The TE 24 and mobile device 26 may be embodied as an integral unit; for example, cellular telephones, handheld devices, and laptop computers.

The intermediary device 14 may generally facilitate mobile device 26 connectivity to the network 18 via the HA 16 associated with the MS 12. Various network protocol and configurations can determine the specific intermediary device, which include foreign agents (FAs), packet serving data networks (PDSNs), and mobility anchor points (MAPs).

The network 18 can encompass any means or construct of device or design, physical or logical. For example, routers and other network devices (not shown) can forward communications from the HA 16 to an intended destination, the correspondent device 20. The communication paths 22 may include any transmission medium, for example, infrared transmission, digital cable, analog line, radio waves and so forth. Further, various protocol and communication schemes can utilize the communication paths 22.

Figure 2:
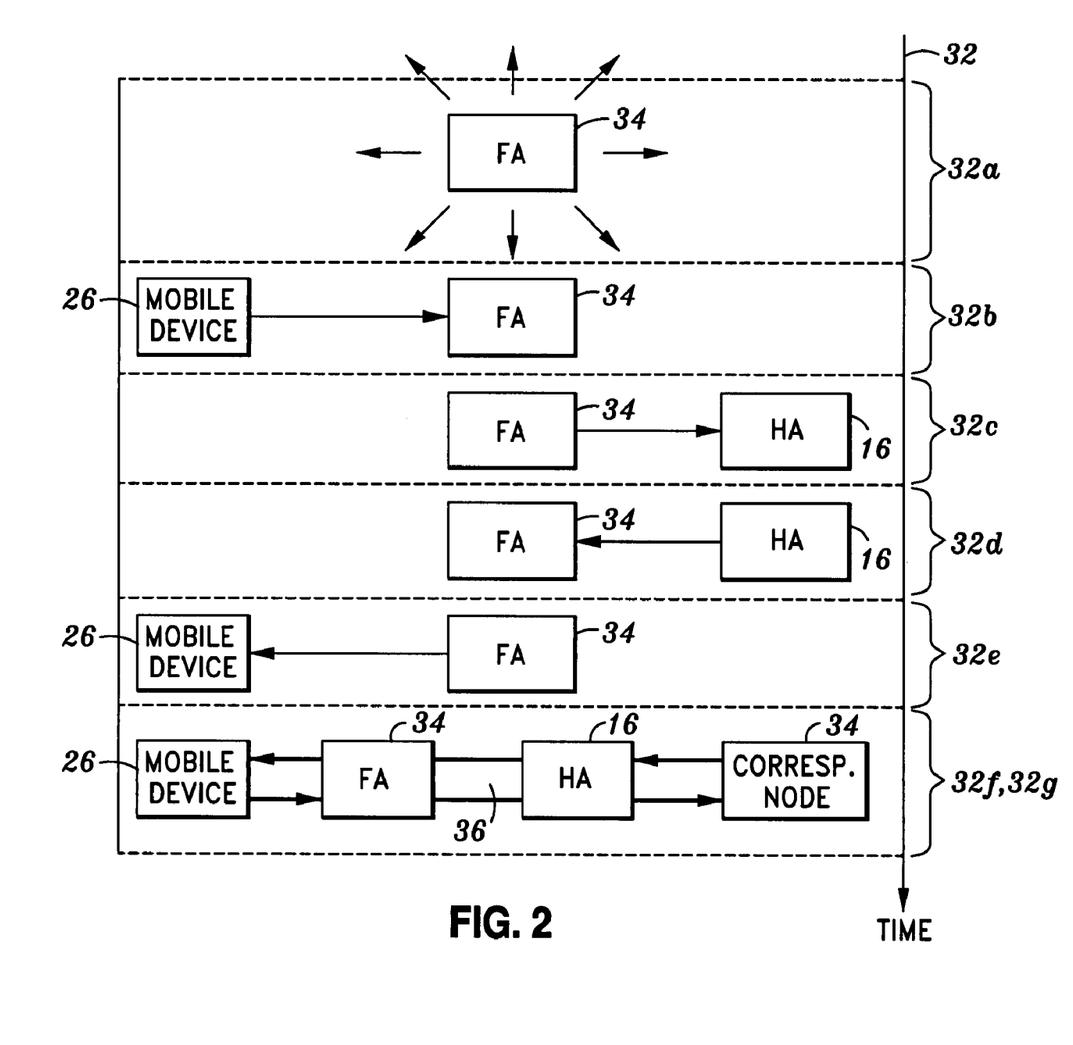
FIG. 2 is a communication flow diagram associated with a registration process in a Mobile IP environment according to an embodiment of the present invention.

FIG. 2 shows a communication flow diagram describing an exemplary registration process in a Mobile Internet Protocol (Mobile IP) environment such as the wireless communication sub-network 10 of FIG. 1. In such an environment, the agent advertisement and solicitation processes, or the agent discovery process, may generally precede the registration, i.e., as shown along timeline 32.

At 32a, the foreign agent (FA) 34 may advertise its services. At 32b, the mobile device 26 may move into the network of the FA 34. Upon receipt of an advertisement from the FA 34, the mobile device 26 may request service from the FA 34, i.e., the mobile device 26 can transmit a request for registration request (RRQ) to the FA 34. At 32c, the FA 34 can process the RRQ and forward it to the associated HA 16 or decline the registration. At 32d, the HA 16 can process the RRQ and formulate a registration reply (RRP) accepting or declining registration. The HA 16 may transmit the RRP to the FA 34. At 32e, the FA 34 may relay the RRP to the mobile device 26. If the HA 16 accepts the registration request, the status relayed to the mobile device 26 can include the lifetime of the new registration. The entire registration process typically utilizes the network 16 without the concurrent presence of IP traffic, i.e., data other than the registration or re-registration messages, thus resulting in relatively low latency.

After registration successfully completes, the user's IP traffic 36 can flow between the mobile device 26 and the correspondent device 20 via the FA 34 and HA 16, as shown at 32f. The IP traffic 36 may include, for example, web-browser or file transfer traffic.

Figure 3:
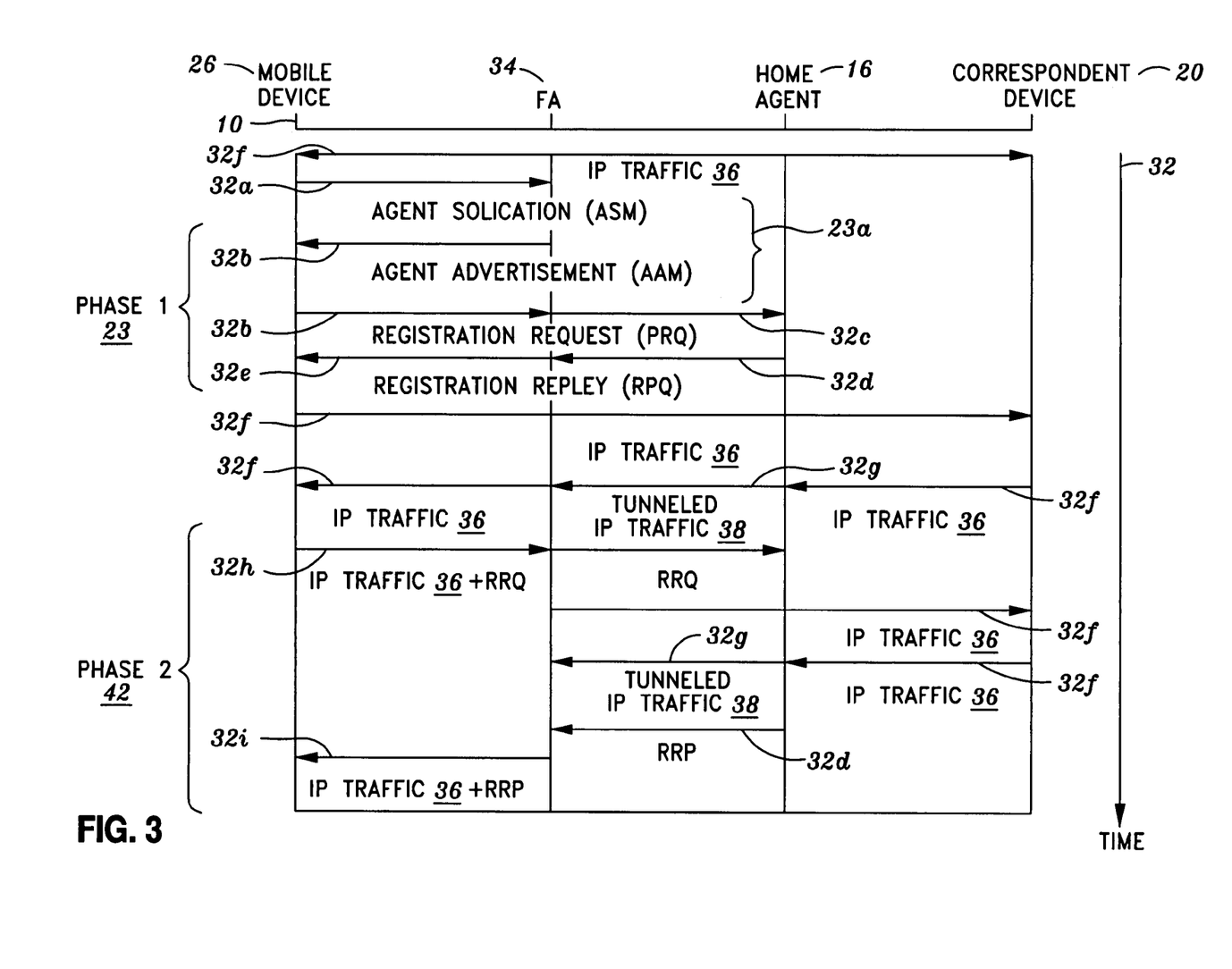
FIG. 3 is a control flow diagram of associated registration and re-registration processes in a Mobile IP environment according to an embodiment of the present invention.

FIG. 3 shows an exemplary message flow diagram and timeline 32 associated with registration and re-registration processes of a Mobile IP subnet environment in the wireless communication sub-network 10; the Mobile IP subnet environment having the mobile device 26; the FA 34; the HA 16; and the correspondent device 20. On the timeline 32, and continuing chronologically from the events described in FIG. 2, the mobile device 26 can establish a connection with a correspondent device 20 and IP traffic 36 can flow therebetween, as shown at 32f. The mobile device 26 may move from one subnet to another, thereby requiring an initial registration with the new FA 34 and the HA 18 to update the care-of address (COA) of the mobile device 26.

Then initial registration phase shown as Phase 1 at 23 may comprise the steps of transmitting an agent advertisement (ASM) at 32a from the intermediary device 14 to the mobile device 26; transmitting an agent solicitation (AAM) at 32b from the mobile device 26 to the intermediary device 14; transmitting an RRQ at 32b from the mobile device 26 to the FA 34 via the intermediary device 14; forwarding the RRQ at 32c from the FA 34 to the HA 16; transmitting an RRP at 32d from the HA 16 to the intermediary device 14; and relaying the RRP at 32e from the intermediary device 14 to the mobile device 26. The Phase 1 step at 23 can be performed without concurrent in-band data; i.e., the ASM, AAM, RRQ and RRP transmittals along any link occur without any additional data transfer to or from the mobile device 26. Further, it is noted that the two initial steps at 23a of Phase 1 at 40 are not required to complete the registration process.

After registration, IP traffic 36 may flow between the mobile device 26 and a correspondent device 22 at 32f. In the exemplary IPv4 embodiment, the HA 16 tunnels IP traffic 38 at 32g destined for the mobile to the intermediary device at 14 for delivery.

During the duration of a current registration (its lifetime), a mobile device 26 may request re-registration. Unlike the initial registration process described above, however, re-registration traffic may be sent concurrent with application data, and thus may be subject to transmission delays while buffered application data is transmitted to and from the mobile device 26. Re-registration, shown as Phase 2 at 42, may comprise the steps of forwarding an RRQ from the mobile device 26 and in-band with the IP traffic 36 at 32b to the intermediary device 14, which can forward the RRQ at 32c to the HA 16. The correspondent device 20 may continue to receive forwarded IP traffic at 32f from the mobile device 26. The correspondent device 20 may transmit IP traffic 36 intended for the mobile device 26 at 32f to the HA 16, which will tunnel the IP traffic 38 at 32g to the intermediary device 14 for delivery to the mobile device 26. Concurrently, the HA 16 may transmit an RRP at 32g to the mobile device 26 via the intermediary device 14; which will forward both the IP traffic and the RRP at 32i to the mobile device 30. The complexity and increased data load of the Phase 2 42 re-registration process can result in a significantly increased latency as compared with the initial registration latency. Further, if the mobile device 26 terminates the re-registration attempt prior to receipt of the RRP, then the process must be redundantly repeated with a greater timeout to completion, further degrading network performance and registration process efficiency.

Figure 4:
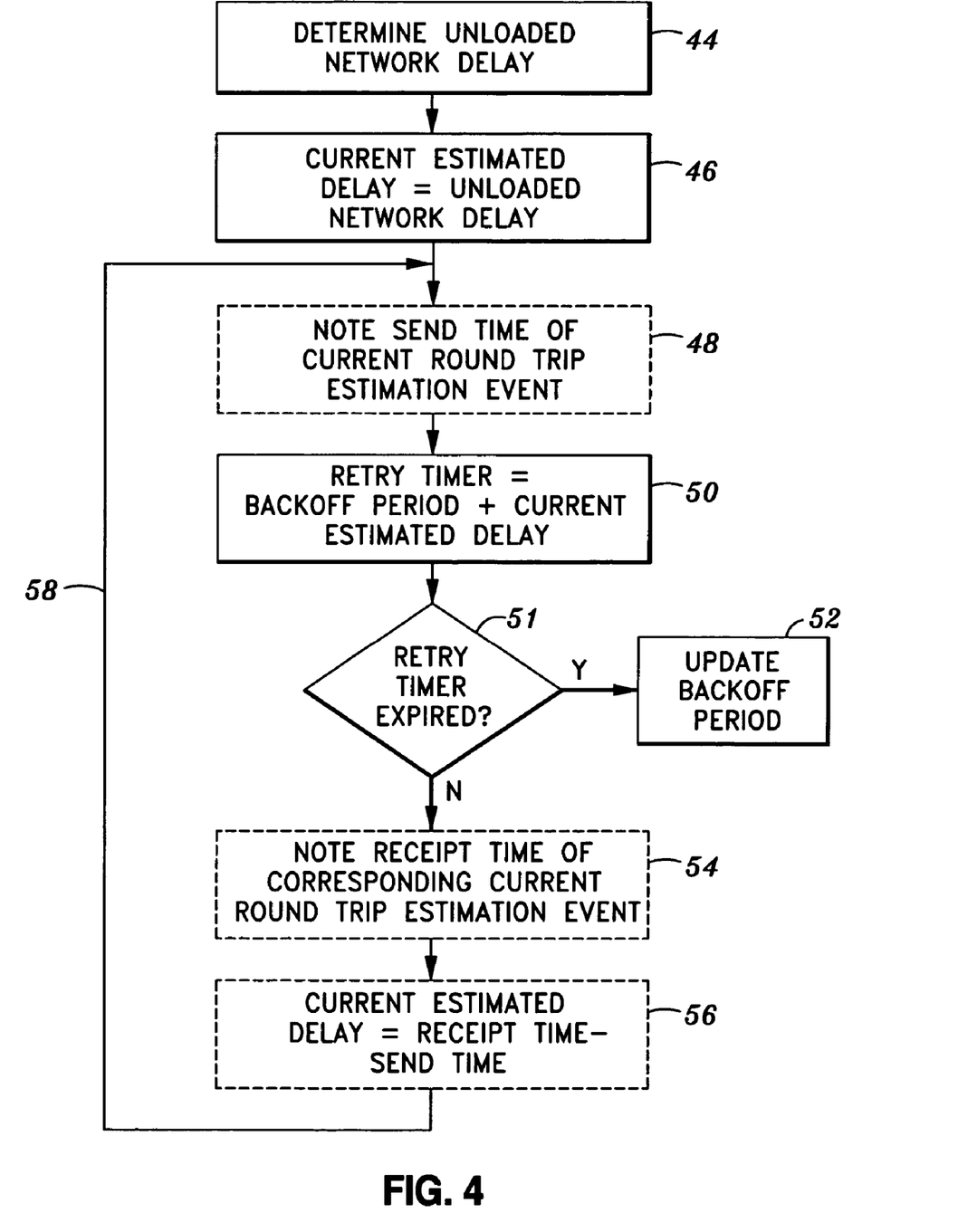
FIG. 4 is a flowchart illustrating an exemplary method according to an embodiment of the present invention.

Turning to FIG. 4, a flowchart illustrates an exemplary method according to an embodiment of the present invention, including the steps of: during the initial re-registration attempt, determining an unloaded network delay according to an initial registration process at 44; setting a current estimated delay equal to the unloaded network delay at 46; upon commencement of subsequent re-registration processes, noting a send time of a current round trip estimation process at 48; setting a retry timer equal to the sum of a predetermined backoff period and the current estimated network delay at 50; if the retry timer expires at 51 before receipt of a registration reply message, then updating the predetermined backoff period at 52 and repeating the step at 50; else noting the receipt time of the current round trip estimation event at 54; and resetting the current estimated delay equal to the difference between the receipt time and the send time at 56. For subsequent re-registration attempts, the process can be repeated from the step at 48, as shown at 58.

One skilled in the art will note that the predetermined backoff period may be determined by various means, including the backoff algorithm described in RFC 2002, supra.

Figure 5:
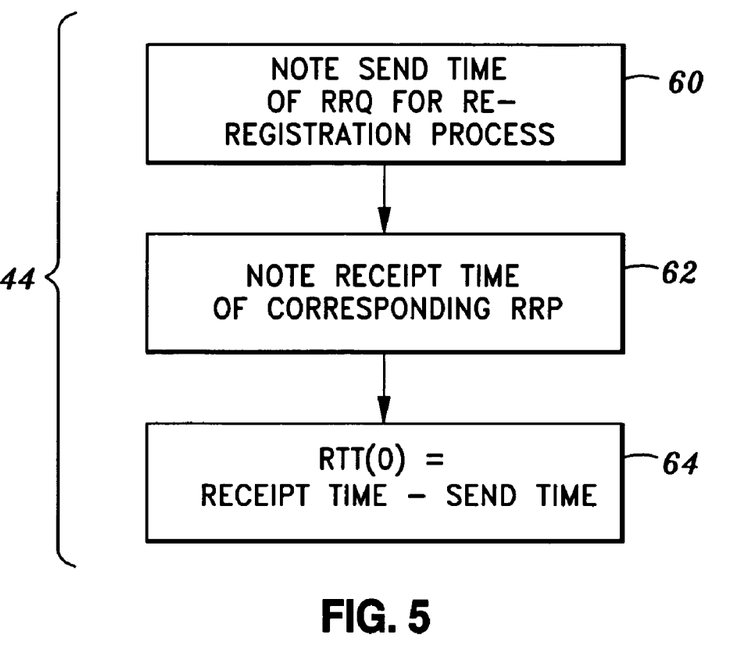
FIG. 5 is a flowchart illustrating one example of a subprocess used to determine an initial RTT (unloaded network) delay according to step 44 of the embodiment of shown in FIG. 4.

Various embodiments can employ various means to initially determine the unloaded network delay (step 44), including, but not limited to, an initial registration process using RRP/RRQ pairs. Turning now to FIG. 5, there is shown a flowchart illustrating one example of an initial registration subprocess used to determine an unloaded network delay during the initial registration process according to the step at 44 of the FIG. 4. The subprocess may include the-steps of noting a send time of an initial registration request (RRQ (initial)) from the mobile device to the home agent at 60; noting a receipt time of a registration reply (RRP(initial)) corresponding to the RRQ(initial) from the home agent to the mobile device at 62; setting the initial registration round trip delay (RTT(0)) equal to the difference between receipt time (RRP(initial)) and the send time (RRQ(initial)); and determining the unloaded network delay at 44 and at 64, according to the formula:

$$RTT(0)=(RRP(initial)-RRQ(initial)),$$

wherein RTT(0) represents the initial registration round trip delay, RRP(initial) represents the receipt time of the initial registration reply, and RRQ(initial) represents the send time of the initial registration request.

The current round trip estimation process, which comprises the steps of 48, 54 and 56 (all shown in phantom), may comprise various sub-processes such as a re-registration subprocess, an echo subprocess, and a packet subprocess.

The re-registration subprocess may utilize substantially the same algorithm set out for the initial registration process to calculate the current estimated delay. For example, at step 48 of FIG. 4, the send time of an RRQ for re-registration is noted; at step 54 of FIG. 4, the receipt of a corresponding RRP is noted; and at step 56 of FIG. 4, the current estimated delay is calculated according to the formula:

$$RTT(current)=RRP(x\_t)-RRQ(x\_t),$$

wherein RTT(current) represents the current estimated round trip delay, RRP(x_t) represents the receipt time of the RRP associated with the current re-registration attempt, and RRQ (x_t) represents the send time of the RRQ associated with the current re-registration. Thus, the re-registration attempt and the current round trip estimation process may be one and the same.

Figure 6:
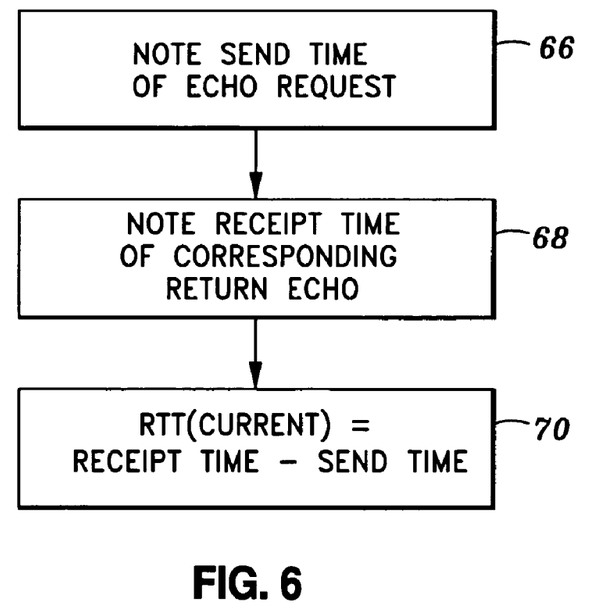
FIG. 6 is a flowchart illustrating another example of a subprocess used to determine the current estimated network delay according to the embodiment of the present invention shown in FIG. 4.
Figure 7:
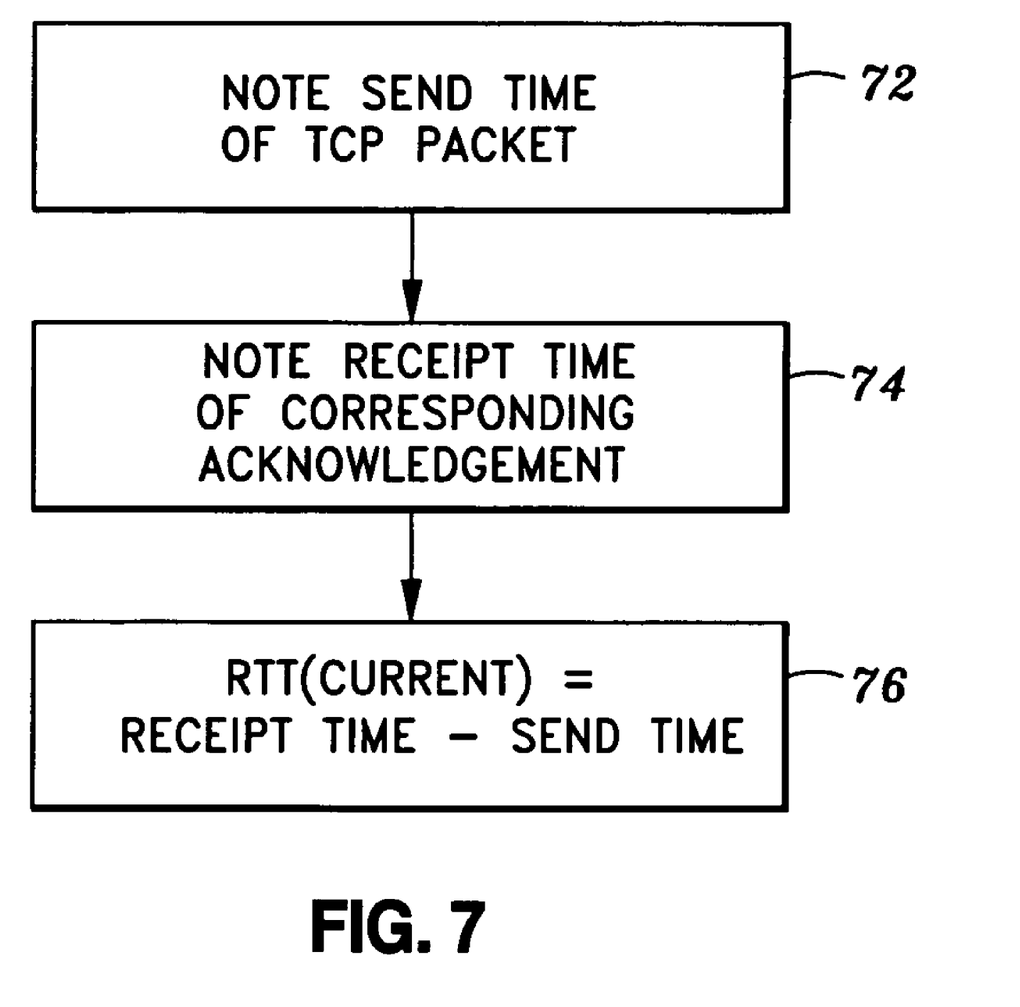
FIG. 7 is a flowchart illustrating yet another example of a subprocess used to determine the current estimated network delay according to the embodiment of the present invention shown in FIG. 4.

The echo and packet subprocesses shown in FIGS. 6 and 7, respectively, may potentially start at the same time, and run concurrently with, the re-registration process or a registration attempt, described above.

The echo process, as shown in FIG. 6, may include the steps of noting a send time of an ICMP echo request (ECHO (send)) from the mobile device to the home agent at 66 (step 48 of FIG. 4); noting the receipt time of a corresponding ICMP echo reply (ECHO(receive)) from the home agent by the mobile device at 68 (step 54 of FIG. 4); and determining the current estimated delay RTT(current) at 70 (step 56 of FIG. 4); according to the formula:

$$RTT(current)=(ECHO(receive)-ECHO(send)),$$

wherein RTT(current) represents the current estimated round trip delay, ECHO(receive) represents the receipt time of the corresponding ICMP echo received from the home agent, and ECHO(send) represents the send time of the ICMP echo request.

One skilled in the art will note that, in various embodiments, the echo subprocess may also be used in place of the re-registration process of FIG. 5, supra, to determine the current estimated network delay during re-registration.

The packet process, as shown in FIG. 7, may include steps of noting the send time of a TCP packet (step 48 of FIG. 4); noting the receipt time of a corresponding acknowledgment from the home agent by the mobile device at 68 (step 54 of FIG. 4); and determining the current estimated delay RTT (current) at 70 (step 56 of FIG. 4); according to the formula:

$$RTT(current)=(ACK(receipt)-PACKET(send)),$$

wherein RTT(0) represents the packet round trip delay, ACK (receipt) represents the receipt time of the acknowledgment, and PACKET(send) represents the send time of the TCP packet.

Figure 8:
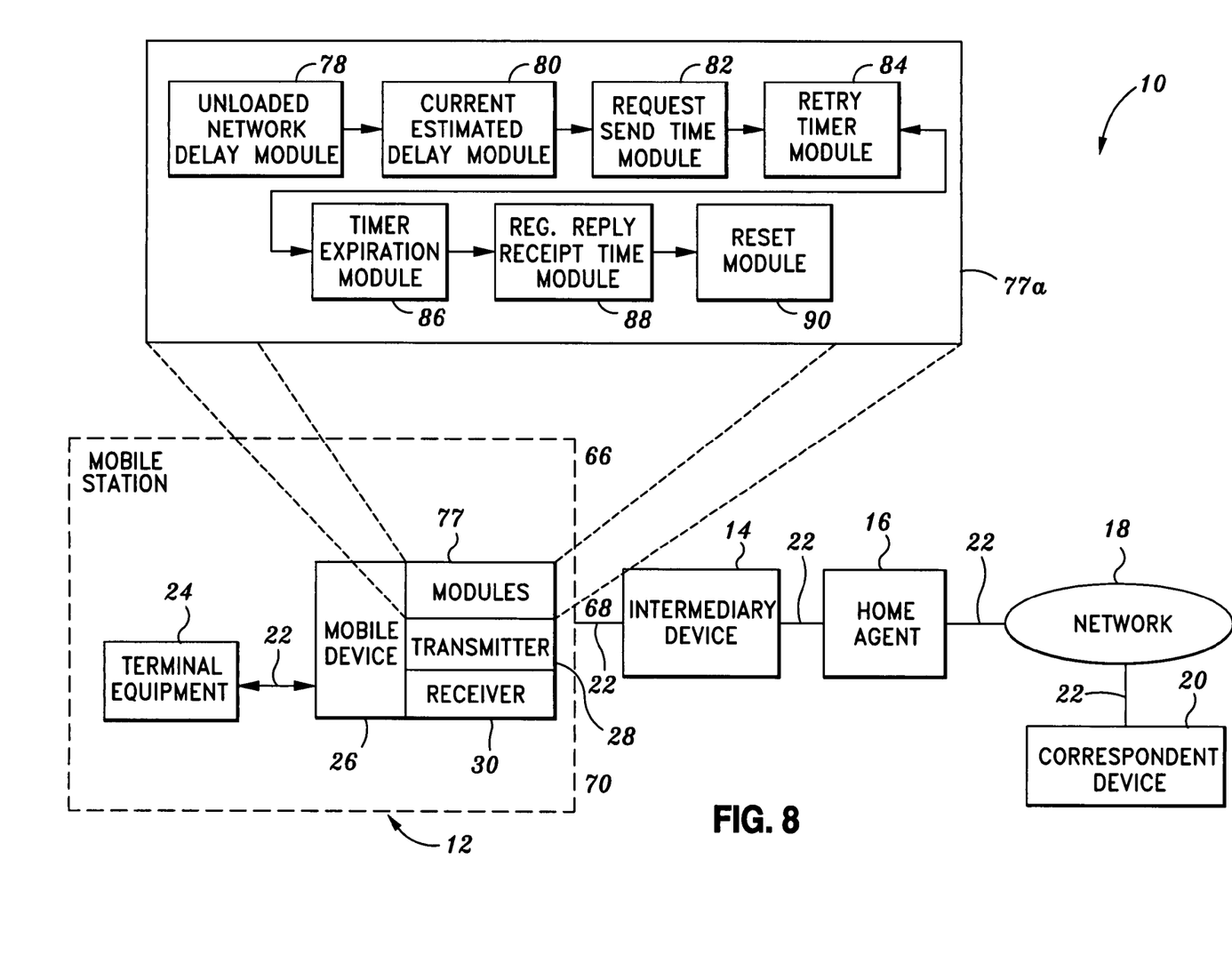
FIG. 8 is a block diagram illustrating an exemplary system according to an embodiment of the present invention.

FIG. 8 illustrates an exemplary system according to an embodiment of the present invention. This embodiment may be used, for example, to determine latency and optimize the re-registration in the wireless communication sub-network shown in FIG. 1. The system may include the MS 12 having the TE 24, communication path 22, mobile device 26, transmitter 28, and receiver 30; the home agent 16; and modules shown generally at 77*a*. In the exemplary embodiment, the system includes the intermediary device 14.

The set of modules 77*a* can include one or more modules to effect latency determination. The module(s) may comprise, for example, software programs, computer hardware, or a combination thereof, either integral to or independent of one or more system components. For example, the modules 77*a* may be embodied as a combination of hardware components and software programs resident on the mobile device 26. The module(s) 77*a* may utilize one or more communication paths 22 or any other means to accomplish latency determination. For example, and with reference to 77*a*, the modules 77 may include an unloaded network delay module 78 for determining the unloaded network delay between the mobile device 26 and the home agent 16; a current estimated delay module 80 for setting a current estimated delay equal to the unloaded network delay; a request send time module 82 for noting a send time of a request for re-registration from the mobile device 26 to the home agent 16 via, for example, the intermediary device 14; a retry timer module 74 for setting a retry timer equal to the sum of a predetermined backoff period and the current estimated network delay 84; a timer expiration module 86 for updating the predetermined backoff period and notifying the retry timer module 84 if the retry timer expires before receipt of a re-registration reply message; a registration reply receipt time module 88 for noting the receipt time of the re-registration reply message from the HA 16 to the mobile device 26 via, for example, the intermediary device 14; and a reset module 90 for setting the current estimated delay equal to the difference between the receipt time and the send time.

The modules 77*a* may reside on the mobile device 26 as one or more software components. When invoked, the unloaded network delay module 78 may measure the network delay for traversal of the communication path 22 between the mobile device 26 and the home agent 16 during the initial Mobile IP registration, and determine an unloaded network delay value.

During the initial registration process, the unloaded network delay module 78 can determine the round trip link latency between the mobile device 26 and the home agent 16 by forwarding an RRQ to the home agent 16 along the communication path 22 and via the intermediary device 14. The home agent 16 may respond with an RRP to the mobile device 26 via the intermediary device 14. The unloaded network delay module 78 may calculate the unloaded network delay value, for example, the total link traversal time for the RRQ-RRP pair. The unloaded network delay value may be calculated from, for example, the difference between the receipt time of the RRP by the mobile device 26 and the send time of the RRQ by the mobile device 26.

The current estimated delay subprocesses may include the re-registration subprocess, the echo subprocess, and the packet subprocess, supra. The echo process may include substantially the same process utilized by the re-registration subprocess; however, an Internet Control Message Protocol (ICMP) echo may be used in place of the RRQ and an ICMP echo reply may be used in place of the RRP. Similarly, the packet process may include the substantially the same process as the re-registration process; however, a Transport Control Protocol (TCP) packet—acknowledgment (ACK) pair replace the RRQ-RRP pair.

The round trip link traversal can occur without the presence of in-band data; therefore, the unloaded network delay value can represent a measurement of time for traversal of an unloaded network link. The unloaded network delay module 78 may pass its unloaded network delay value to the current estimated delay module 80, which can set a current estimated delay value equal to the received round trip delay value.

To determine the current estimated delay during current round trip estimation process, for example, a re-registration attempt, the request send time module 82 may establish a value representing the start time of the current round trip estimation process; for example, the send time of the RRQ from the mobile device 26 to the home agent 16.

The retry timer module 84 may set, at the start time of the current round trip estimation process, a retry timer. The time set on the retry timer can correspond to the total time value of a predetermined backoff period and the value of the current estimated delay.

The timer expiration module 86 can monitor the timer countdown and the progress of the current round trip estimation process. If the time on the retry timer expires prior to an end time of the current round trip estimation process, for example, receipt of the RRP by the module device 26 from the home agent 16, the retry timer module 84 may be re-invoked, which resets the time on the retry timer with a value corresponding to an updated predetermined backoff period and the value of the current estimated delay. If the current round trip estimation process ends before the retry timer expires, then the reset module 90 may calculate an updated current estimated delay from the difference between the start time and the end time of the current round trip estimation process; for example, the difference between the receipt time of the RRP and the send time of the RRQ during the re-registration attempt.

It should be understood, of course, that the foregoing relates to preferred embodiments of the invention and that modifications may be made without departing from the spirit and scope of the invention as set forth in the following claims.

We claim:

1. A method of optimizing a timing of re-registration of a mobile device with a wireless network, comprising:
performing, via a link, an initial registration process with a wireless network to generate a current registration;
determining an unloaded network delay for round trip traversal of the link corresponding to the initial registration process, wherein the round trip traversal of the link occurs without concurrent in-band data;
setting a current estimated delay equal to the unloaded network delay;
performing a re-registration process during a duration of the current registration, including:
transmitting a re-registration request to the wireless network;
initiating a current round trip estimation process during the re-registration process, wherein the current round trip estimation process has a start time and an end time defining a current round trip traversal, wherein the current round trip traversal occurs with concurrent in-band data;
setting a retry timer equal to the sum of a predetermined backoff period and the current estimated network delay;
if the retry timer expires before the end time of the current round trip estimation process, increasing the predetermined backoff period and repeating the transmitting of the re-registration request and the initiating of the current round trip estimation process; and
resetting, at an end of the re-registration procedure, the current estimated delay equal to a difference between the end time of the current round trip estimation process and the start time of the current round trip estimation process.

2. The method of claim 1, wherein the performing is via a wireless communication sub-network incorporating the link.

3. The method of claim 1, wherein the link is between the mobile device and a home agent.

4. The method of claim 1, wherein the current round trip estimation process further comprises at least one of an echo subprocess or a packet subprocess running concurrently with the re-registration process.

5. The method of claim 1, wherein the start time further comprises a send time of the re-registration request.

6. The method of claim 1, wherein the end time further comprises a receipt time of a re-registration reply.

7. The method of claim 1,
wherein the resetting further comprises noting a receipt time of a re-registration reply if the retry timer does not expire before the receipt time, and resetting the current estimated delay equal to the difference between the receipt time and the send time.

8. The method of claim 1, wherein the initial registration process further comprises:
noting a send time of an initial registration request from the mobile device to a home agent;
noting a receipt time of a registration reply corresponding to the initial registration request from the home agent to the mobile device; and
determining the unloaded network delay according to the formula:

$$RTT(0) = (RRP(initial) - RRQ(initial)),$$

wherein RTT(0) represents an initial registration round trip delay, RRP(initial) represents the receipt time of the initial registration reply sent by the HA, and RRQ(initial) represents the send time of the initial registration request.

9. The method of claim 1, wherein the current round trip estimation process further comprises a re-registration subprocess.

10. The method of claim 9, wherein the re-registration subprocess further comprises:
noting the send time of an RRQ for re-registration;
noting the receipt time of a corresponding RRP; and
determining the current estimated round trip delay according to the formula:

$$RTT(current) = RRP(x\_t) - RRQ(x\_t),$$

wherein RTT(current) represents the current estimated round trip delay, RRP(x\_t) represents the receipt time of the RRP associated with the current re-registration attempt, and RRQ(x\_t) represents the send time of the RRQ associated with the current re-registration.

11. The method of claim 1, wherein the current round trip estimation process further comprises an echo subprocess.

12. The method of claim 11, wherein the echo subprocess further comprises:
noting a send time of an ICMP echo request from the mobile device to an agent device;
noting a receipt time of a corresponding ICMP echo from the agent device to the mobile device; and
determining the current estimated network delay according to the formula:

$$RTT(current)=(ECHO(receive)-ECHO(send)),$$

wherein RTT(0) represents the current estimated round trip delay, ECHO(receive) represents the receipt time of the corresponding ICMP echo received from the agent device, and ECHO(send) represents the send time of the ICMP echo request.

13. The method of claim 1, wherein the current round trip estimation process further comprises a packet subprocess.

14. The method of claim 13, wherein the packet subprocess further comprises:
noting a send time of a TCP packet sent from the mobile device to a home agent;
noting a receipt time of a corresponding acknowledgment sent from the home agent to the mobile device; and
determining the current estimated network delay according to the formula:

$$RTT(current)=(ACK(receipt)-PACKET(send)),$$

wherein RTT(current) represents the current estimated round trip delay, ACK(receipt) represents the receipt time of the acknowledgment, and PACKET(send) represents the send time of the TCP packet.

15. A mobile device with optimized re-registration timing, comprising:
means for performing, via a link, an initial registration process with a wireless network to generate a current registration;
means for determining an unloaded network delay for round trip traversal of the link corresponding to the initial registration process, wherein the round trip traversal of the link occurs without concurrent in-band data;
means for setting a current estimated delay equal to the unloaded network delay;
means for performing a re-registration process during a duration of the current registration, including:
means for transmitting a re-registration request to the wireless network;
means for initiating a current round trip estimation process during the re-registration process, wherein the current round trip estimation process has a start time and an end time defining a current round trip traversal, wherein the current round trip traversal occurs with concurrent in-band data;
means for setting a retry timer equal to the sum of a predetermined backoff period and the current estimated network delay;
if the retry timer expires before the end time of the current round trip estimation process, means for increasing the predetermined backoff period and repeating the transmitting of the re-registration request and the initiating of the current round trip estimation process; and
means for resetting, at an end of the re-registration procedure, the current estimated delay equal to a difference between the end time of the current round trip estimation process and the start time of the current round trip estimation process.

* * * * *